US010908682B2

(12) United States Patent
Goossens

(10) Patent No.: US 10,908,682 B2
(45) Date of Patent: Feb. 2, 2021

(54) EDITING CUTS IN VIRTUAL REALITY

(71) Applicant: GOOGLE INC., Mountain View, CA (US)

(72) Inventor: Erik Hubert Dolly Goossens, San Francisco, CA (US)

(73) Assignee: Google LLC, Mountain View, CA (US)

( * ) Notice: Subject to any disclaimer, the term of this patent is extended or adjusted under 35 U.S.C. 154(b) by 279 days.

(21) Appl. No.: 15/656,843

(22) Filed: Jul. 21, 2017

(65) Prior Publication Data
US 2018/0024630 A1  Jan. 25, 2018

Related U.S. Application Data

(60) Provisional application No. 62/365,219, filed on Jul. 21, 2016.

(51) Int. Cl.
G06F 3/01 (2006.01)
G06F 3/0481 (2013.01)
G11B 27/10 (2006.01)
G06T 19/20 (2011.01)
G09G 5/14 (2006.01)

(52) U.S. Cl.
CPC .............. *G06F 3/013* (2013.01); *G06F 3/011* (2013.01); *G06F 3/04815* (2013.01); *G06T 19/20* (2013.01); *G09G 5/14* (2013.01); *G11B 27/102* (2013.01); *A63F 2300/8082* (2013.01);
(Continued)

(58) Field of Classification Search
CPC ...... G06F 3/013; G06F 3/011; G06F 3/04815; G06T 19/20; G06T 2219/2004; G09G 5/14; G09G 2320/10; G09G 2354/00; G11B 27/031; A63F 2300/8082
See application file for complete search history.

(56) References Cited

U.S. PATENT DOCUMENTS

2010/0169837 A1  7/2010  Hyndman
2012/0188233 A1  7/2012  Shuster et al.
(Continued)

OTHER PUBLICATIONS

International Search Report and Written Opinion for PCT Patent Application No. PCT/2017/043347, dated Oct. 6, 2017, 10 pages.
(Continued)

*Primary Examiner* — Patrick N Edouard
*Assistant Examiner* — Eboni N Giles
(74) *Attorney, Agent, or Firm* — Brake Hughes Bellermann LLP

(57) ABSTRACT

A computer-implemented method is described for configuring interaction zones for a virtual reality environment. The method may include defining a plurality of scenes, each scene including a plurality of selectable scene cuts and defining a first interaction zone and a second interaction zone. The method may also include automatically selecting a first scene cut to display the first scene, in response to detecting that a gaze direction, associated with a user accessing the virtual reality environment, is directed toward the first interaction zone. The method may also include automatically selecting a second scene cut to display the second scene, in response to detecting that the gaze direction, associated with the user accessing the virtual reality environment, is directed toward the second interaction zone. The first or second scenes may be triggered for display in a head mounted display device.

18 Claims, 5 Drawing Sheets

(52) U.S. Cl.
CPC .. *G06T 2219/2004* (2013.01); *G09G 2320/10* (2013.01); *G09G 2354/00* (2013.01)

(56) References Cited

U.S. PATENT DOCUMENTS

2016/0191893 A1* 6/2016 Gewickey ............ H04N 13/388
386/223
2017/0358141 A1* 12/2017 Stafford ............... G02B 27/017

OTHER PUBLICATIONS

Langbehn, et al., "Subliminary Reoirentation and Repositioning in Virtual Reality During Eye Blinks", Research Gate (https://www.researchgate.net/publication/308625325), Sep. 26, 2016, 2 pages.

Peck, et al., "Evaluation of Reorientation Techniques and Distrators for Walking in Large Virtual Environments", IEEE Trans Vis Comput Graph., vol. 15(3), doi:10.1109/TCVG.2008.191, 2009, 383-394.

* cited by examiner

EDITING CUTS IN VIRTUAL REALITY

CROSS REFERENCE TO RELATED APPLICATION

This application is a continuation of, and claims priority to U.S. Provisional Application No. 62/365,219, filed on Jul. 21, 2016, entitled "EDITING CUTS IN VIRTUAL REALITY", the disclosure of which is incorporated herein by reference.

TECHNICAL FIELD

This description generally relates to the use of editing virtual content in a virtual reality (VR) environment.

BACKGROUND

In general, virtual reality can surround and immerse a person in a computer-generated, three-dimensional (3D) environment. A director of virtual reality content can create a story or world for the person using the VR environment. The story can be rendered in a VR display device, such as a helmet that includes a screen, glasses or goggles that a user looks through when viewing a screen (e.g., a display device or monitor). Once the person enters the VR environment, the person can interact with the story in a way (e.g., a physical way) that seems real to the person.

SUMMARY

A system of one or more computing devices can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method is described for configuring interaction zones for a virtual reality environment. The method may include defining a plurality of scenes, each scene including a plurality of selectable scene cuts and defining a first interaction zone and a second interaction zone. The first interaction zone may be associated with a first scene in the plurality of scenes and the second interaction zone may be associated with a second scene in the plurality of scenes. The method may also include automatically selecting a first scene cut to display the first scene, in response to detecting that a gaze direction, associated with a user accessing the virtual reality environment, is directed toward the first interaction zone. The method may also include automatically selecting a second scene cut to display the second scene, in response to detecting that the gaze direction, associated with the user accessing the virtual reality environment, is directed toward the second interaction zone. The first or second scenes may be triggered for display in a head mounted display device.

Implementations may include one or more of the following features. The method may also include detecting a location of the user within the virtual reality environment, generating content to extend the first scene, in response to determining that the user is moving toward the first interaction zone, and triggering for display in the head mounted display device, the generated content using a third scene cut, when the gaze direction associated with the user is directed away from the first interaction zone.

The method may also include receiving user settings indicating a level of experience for the user with the virtual environment and modifying the selected scene according to the user settings. In response to exhausting a countdown timer, the method may include automatically selecting and performing the first scene cut and triggering display of the first scene in the head mounted display device.

In response to exhausting a countdown timer, the method may include generating a virtual feature for the second interaction zone and performing the second scene cut upon triggering display of the virtual feature in the head mounted display device and triggering display of the second scene in the head mounted display device. In some implementations, the virtual feature is configured to attract the gaze direction, associated with the user, toward the second interaction zone in the virtual reality environment.

The method may also provide the plurality of selectable scene cuts in virtual reality editing software for defining a plurality of interaction zones within the plurality of scenes, defining a plurality of scenes using a plurality of images, and associating at least one of the plurality of selectable scene cuts with at least one of the plurality of scenes and at least one of the plurality of interaction zones.

Implementations of the described systems may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
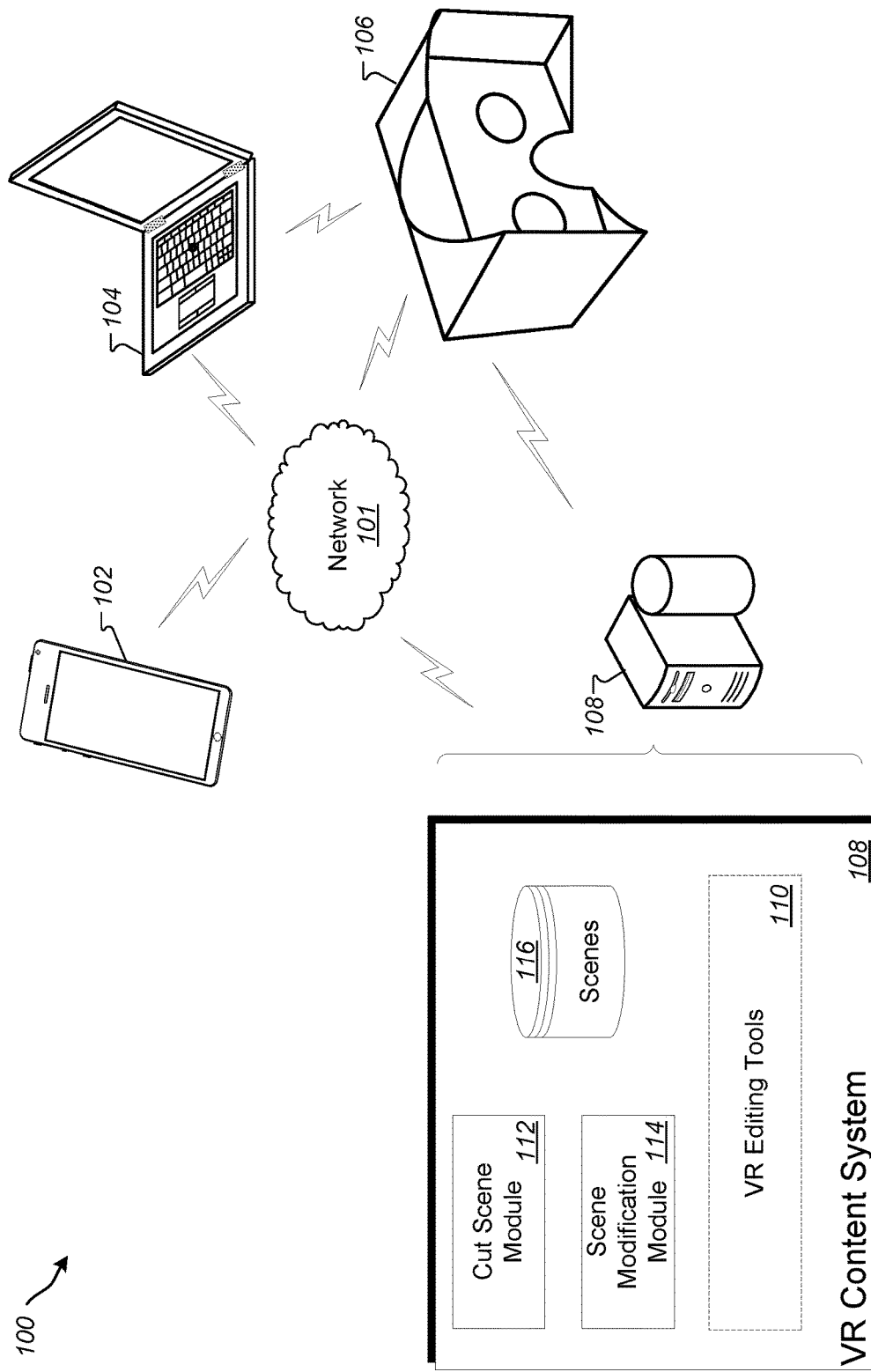
FIG. 1 is a block diagram of an example system for accessing editing tools for performing scene cuts to provide virtual content in a 3D virtual reality (VR) environment.

Story telling in virtual reality typically includes combining multiple scenes together to create a world of content that a user can explore. The world of content can include images from a number of different real-life scenes, people, and objects captured with video, for example. It can be difficult to accurately combine multiple portions of such video content to provide a realistic VR environment when moving from one scene into another scene. Combining the varied scenery to provide a realistic feel and a smooth transition between the video content can be a challenge to virtual reality (VR) directors (e.g., a producer of VR content). For example, one challenge in providing a transition, also referred to as scene cut, between one scene in a VR environment and another scene in the VR environment, may be to ensure that the transition is smooth in the sense that the perception of the transition does not cause a user's disorientation, physical imbalance, cardiac circulatory weakness, and/or an undue increase in physical or mental stress level. The systems and methods described herein can be used to provide tools to implement editing cuts (e.g., scene cuts) to ensure such smooth transitions between scenes. VR directors can use editing tools to manipulate, cut, splice, and configure the content to provide realistic transitions between scenes and to provide a comfortable VR environment in which a user, accessing the VR environment, can explore virtual content. For example, providing a comfortable VR environment may include reducing unnatural scene changes by providing editing tools that can be used to modify aspects of the virtual content such that the content presents natural scene changes. In general, the editing tools can include scene manipulation tools, camera angle selection tools, cut configuration tools, and timelines, just to name a few examples. The editing tools can be applied to captured video content, virtual reality (VR) content, and/or a combination of both.

As used herein, content and/or VR content may pertain to captured video footage (e.g., real-world video capture), omnidirectional (360 degree 3D) footage, pre-rendered video footage (e.g., pre-stitched/computationally stitched images), pre-recorded video footage, pre-stitched video footage, and/or computer-generated content. Captured video footage can be collected using one or more omnidirectional cameras. For example, given a set of images (captured using an omnidirectional camera), perspective images/video can be generated for both left and right eye perspective views for any given gaze direction (e.g., of a VR headset or HMD device).

VR directors can use editing tools (e.g., video editing tools) to divide particular content into zones. A zone may describe a portion of a scene displayed in the VR environment. Zones can be split according to content or function. For example, a zone can be configured for interactive use or for passive viewing use. Interactive zones may apply to zones in which a user can actively cause changes within the content/objects in the zone and in some examples, zones in which the user can receive feedback from the zones. Passive zones may apply to zones that are not interactive and exist simply to provide scenery as a user passes one or more of the zones, for example.

In some implementations, dividing VR content into zones can ensure that the VR director is provided one or more placeholder areas in which to provide transitions (i.e., scene cuts) from one scene to another scene. For example, if a virtual user is walking through the woods toward a large tree, the VR director can use scene cuts to preconfigure that a virtual user (e.g., user accessing a virtual reality environment) can transition into additional forest beyond the large tree. Similarly, the VR director can preconfigure that the virtual user can transition into an office hallway, desert, snowstorm, etc. The VR director can select which transitions would provide a natural and/or realistic experience for the user. In this example, the VR director would likely transition to additional forest, rather than the office hallway, desert, snowstorm, etc. To do so, the VR director may configure the system 100 to detect a gaze direction associated with the user and can use cues from that detected gaze to determine when and how to provide such a transition (e.g., a scene cut). A cue may include, but is not limited to an eye movement indicating a gaze direction, an eye movement indicating a selection, an eye movement or head movement indicating a change in direction, etc. The VR director can configure any number of scene cuts to be carried out based upon detecting a direction of the user's eye gaze. If the user gazes left, the VR director can arrange to provide a particular sequence of images and/or scene cuts. If the user gazes right, the VR director can arrange to provide another sequence of images and/or scene cuts. Such scene cuts can also use cues in eye gaze such as a quick look left, a slow look right, an extended eye closing, or an eye roll, just to name a few examples. In addition, the VR director can configure the VR space to display scene cuts at a particular speed to provide for a sense of feeling responsive to displaying the scenes in a specific way.

In another example, if a scene involves a user floating in the river and overlooking a waterfall, and the VR director wishes to place the user poolside on a skyscraper rooftop swimming pool, the VR director can configure a scene cut based on a number of gaze cues that a VR user may use when consuming the VR content under edit. For example, the VR director can configure to provide a scene cut of the user looking down over the side of the skyscraper at the street far below if the user gazes over the waterfall in the waterfall scene. The scene cut can be configured based on the reasoning that both the street and the river are far away from the user and the distances between overlooking the waterfall and overlooking the skyscraper may be similar. Such a scene cut may be less jarring to the user than if the user were not looking over the waterfall when the street scene over the side of the skyscraper is triggered with a scene cut. If the VR director instead oriented the user (looking over the waterfall) to be looking down into the swimming pool, that scene cut may be jarring to the user because the change from peering at water hundreds of feet away to peering at water a few feet away is disparate with respect to distance measurements.

In general, the gaze of the user can be used as a trigger to ensure that unexpected changes in scenery do not jar the user when moving from zone to zone or scene to scene. For example, if a scene is configured to allow the user to gaze over a waterfall, the VR director may configure a scene cut that causes the user to be gazing at realistic VR content, rather than to configure a scene cut causing the user to gaze at unexpected VR content (e.g., viewing the ground in the next scene after being in water viewing rapids over a waterfall). In this example, unexpected VR content can be jarring to the user who may be expecting to see additional water and similar scenery when peering over the waterfall. The VR director may instead configure VR content and/or video scenes to provide a scene cut that shows a riverbed and rapidly moving water.

In some implementations, the VR director can configure VR content to employ a cut window, which provides a particular time period before scene cuts are implemented and displayed to the user. For example, the VR director can use a ten second cut window to ease user transition from a first scene to a second scene. In this example, the VR director can configure a scene cut such that any time during the ten second window, the viewer can be transitioned from a landscape scene to a cityscape scene. The scene cut can be triggered by the elapsed time of ten seconds, or alternatively, can be configured to occur if the gaze of the user is detected in a particular zone before a preconfigured time period has elapsed. For example, if the gaze of the user is detected in a first zone at about three seconds, the scene cut can be performed and displayed to the user instead of waiting for the preconfigured time period to elapse. A similar trigger can be configured to wait until the gaze of the user is detected in the first zone before performing the scene cut. In another example, a trigger can be configured to perform the scene cut at a predefined maximum elapsed time regardless of the gaze of the user. In another example, a trigger can be configured to perform scene cuts upon detecting that a user is moving in a particular direction toward or away from specific objects, zones, or scenery. Timers, sensing, and tracking of users in the virtual environment can be carried out by the systems described herein.

Because the triggers can be based upon user movement or actions, the VR content can be configured to be dynamic and/or interactive in nature. In some implementations, a scene cut or transition may be applied to VR content based on rules that can be configured and implemented by the VR director. The rules can be configured to be carried out based on any of the triggers discussed throughout this disclosure. In some implementations, the rules may be configured specifically to make changes to video VR content and as such, film editing techniques and tools can be used to carry out the configured rules.

In yet another example, a gaze trigger, movement trigger, or other trigger can be configured to distract the user or to gain attention from the user in a particular zone. In response to detecting the gaze of the user in the particular zone, a scene cut can be performed. For example, if a rendered VR user is standing in a landscape scene viewing a tree to one side of the user and a pasture in front of the user with a sunset beyond the pasture, the VR director can configure a virtual object, such as a pond to shimmer, and the shimmer can attract the gaze of the user. If the user gazes at the pond, the pasture can be replaced with a city sidewalk, with the same sunset, for example, in order to provide a wide open view of scenery different from the pasture, but similar in expanse. The shimmer of the pond can distract the user from peering at objects in the immediate scenery to prepare the user for viewing outward into a distance so that the scenery change from pasture to sidewalk is subtle, rather than jarring and/or distracting to the user. The editing tools described herein can suggest to a VR direction, for example, one or more scenes for a scene cut based on one or more other scenes in virtual content. The one or more other scenes can be used as a trigger to provide a suggested scene to reduce jarring content being displayed to the user. In some implementations, a scene cut can be set to trigger upon detecting the user gaze at the pond. The scene cut can alternatively be set to trigger upon a predetermined gaze time associated with the user gazing at the pond. For example, a gaze time of five seconds can be configured as a lazy scene cut in which the scene cut occurs at a detected gaze time associated with a particular zone (e.g., the pond in this example). In this fashion, the user can be directed to gaze off into the sunset in both scenes to provide a recognizable object between scenes. The lazy scene cut can be used to allow the VR director to configure VR content to employ time windows in which to detect user gaze or movement. The detected gaze or movement can be used to trigger a scene cut to another scene.

FIG. 1 is a block diagram of an example system for accessing editing tools for performing scene cuts to provide virtual content in a 3D virtual reality (VR) environment. In general, the system 100 may provide the 3D VR environment and VR content for a VR director to access, view, and interact with using the methods, components, and techniques described herein. In particular, system 100 can provide the VR director with options for accessing and editing the VR content, virtual objects, and editing tools. For example, the VR director can edit VR content to provide scene cuts at appropriate times for a user to provide smooth transitions between scenes and to avoid jarring changes in the scenes.

As used herein, a "cut" or "scene cut" is defined as one or more selectable image frames that can provide a scene for display in a VR environment. A scene may include a plurality of scene cuts depicting objects and/or imagery. A video (e.g., set of images/frames) can be arranged as a hierarchical structure of a plurality of scene cuts and/or scenes and putting several scene cuts and/or scenes together can generate a motion picture. In general, an identifying number is assigned to each scene cut and/or each scene, and a director (e.g., user, VR director, etc.) can select scene cuts and scenes to produce VR content.

As shown in FIG. 1, the example system 100 includes a plurality of computing devices that can exchange data over a network 101. The devices may represent clients or servers and can communicate via network 101, or other network. The client devices may include a mobile device, an electronic tablet, a laptop, a camera, VR glasses, or other such electronic device that may be used to access VR content.

The system 100 includes a mobile device 102, a laptop computing device 104, head mounted display (HMD) device 106, and VR content system 108. Devices 102, 104, and 106 may represent client devices. Mobile device 102, laptop 104, and HMD device 106 can include one or more processors and one or more memory devices. The devices 102-106 can execute a client operating system and one or more client applications that can access, control, and/or display VR content on a display device included in each respective device. The VR content system 108 may represent a server device. In general, VR content system 108 may include any number of repositories storing content and/or virtual reality software modules that can generate, modify (e.g., edit), or execute virtual reality scenes.

The HMD device 106 may represent a virtual reality headset, glasses, eyepiece, or other wearable device capable of displaying virtual reality content. In operation, the HMD device 106 can execute a VR application (not shown) which can playback received and/or processed images to a user. In some implementations, the VR application can be hosted by one or more of the devices 102, 104, 106, or 108, shown in FIG. 1.

In some implementations, the mobile device 102 can be placed and/or located within the HMD device 106. The mobile device 102 can include a display device that can be used as the screen for the HMD device 106. The mobile device 102 can include hardware and/or software for executing the VR application and/or editing tools 110.

Additional devices are possible and such devices may be configured to be substituted for one another. In some implementations, the devices 102, 104, 106, and 108 can be laptop or desktop computers, smartphones, personal digital assistants, portable media players, tablet computers, gaming devices, or other appropriate computing devices that can communicate, using the network 101, with other computing devices or computer systems.

In the example system 100, the VR content system 108 can include VR editing tools 110. The VR editing tools 110 can be configured to execute on any or all of devices 102, 104, 106, and 108. In some implementations, the system 100 can be configured to provide editing tools 110 for generating data for a 3D (three-dimensional) movie editor. For example, the editing tools 110 can be accessed by a VR director and can include a movie editing suite which enables editing within a three-dimensional virtual environment. In some examples, this may be implemented, for example, by providing a green screen function somewhat analogous to the green screen used for real life films. In some implementations, the green screen may be incorporated by omitting content to render a background portion of the 3D scene and provide a green background, for example as a green screen color plane. This green screen function may then be employed to add alternative backgrounds, in particular 3D models, for example of scenes that the VR director wishes to provide to a user accessing a VR environment.

In some implementations, the VR editing tools 110 can be configured to allow a VR director to splice together images and/or scene cuts into a complete scene or VR movie. The VR director can determine where and when to perform scene cuts to create a smoothly flowing narrative in terms of time of presentation of a particular scene cut as well as placement of the scene cut, for example.

In some implementations, the VR editing tools 110 can be configured to include a tool for performing straight scene cuts. Straight scene cuts may include cutting single images (e.g., shots) in scenes. The straight scene cut may be used to replace one scene instantly with another scene. In some implementations, VR directors can configure content to use transitions to perform a modified and/or delayed scene cut, rather than a straight scene cut. For example, the VR director can configure content to splice together scene cuts using one or more transitions. Such transitions may include, but are not limited to dissolving, fading, wiping, cutaway, split/L-cut, iris, contrast cutting, graphic match cutting, parallel editing cutting, jumping, blurring, morphing, etc.

In some implementations, the VR editing tools 110 can be configured to include a tool for performing cross-cut editing. Cross-cut editing may include editing images to account for a switching of a point of view of the scene. Similarly, the editing tools can be used to configure a cross-fade scene in which, for example, a scene background changes while a rendered user remains, eventually seeming to transfer the rendered user to a different, new environment.

In some implementations, the VR editing tools 110 can be configured to analyze depth and lighting information for objects and scenes within the video content. The VR editing tools 110 can be configured to analyze depth and lighting information to provide mapping suggestions to a VR director. The mapping suggestions can include mapping final gaze to initial gaze directions between scenes that the VR director can configure during video editing.

The VR editing tools 110 can support a number of simultaneously composited video tracks, audio tracks, multi-camera editing for combining video from multiple camera sources, as well as standard ripple, roll, slip, slide, scrub, razor blade and time remapping edit functions. The editing tools can include a range of video and audio filters and keying tools, mattes, vocal de-poppers and de-essers. The VR editing tools 110 may also include color correction, 2D to 3D transformation, filters, and videoscopes.

As shown in FIG. 1, the VR content system 108 includes a cut scene module 112, a scene modification module 114, and a scenes repository 116. The cut scene module 112 can be used to configure cut criteria such as triggers, timers, or other criteria used to allow performance of a scene cut.

In general, the cut scene module 112 can be accessed by a VR director to generate VR content (e.g., video content, still content, etc.) that can be interacted with by a user. The generated VR content can be formatted or packaged to include cut scene triggers or rules that specify when particular scenes should be cut, how scenes should be cut, angles in which scenes should be oriented or reoriented upon being cut, and what actions or input can trigger such scene cuts. In some implementations, the cut scene module 112 can be configured to provide users with options for selecting director-configured scene cuts. The VR director can preconfigure a number of selectable scene cut options associated with the VR content.

In a non-limiting example, a user can be presented with a number of scene cut options during playback or before playback. Such options may include providing a user with an option to consistently perform a scene cut without waiting for timers to expire. This option may be selected by a user who does not wish to wait for the VR environment to detect that the user is in position to receive a non-jarring or unnatural cut. This user may wish to hurry along the content when she is finished with a scene. In this example, the user can preselect the option to remove all scene cut timers or delays from the VR content.

In another non-limiting example, the user may wish to have the VR environment feel very realistic and may select an option such as extending timers until the rendered VR user performs tasks that trigger scene cuts. This way of triggering scene cuts enhances the realism with which the user perceives the VR environment, since a scene cut occurs in response to a specific user interaction, such as the user performing a certain task. In this example, the user may wish to interact naturally with the VR environment and may not wish to see scene cuts unless she triggers them with physical actions rendered into the environment or through eye gaze or hover detected by the VR environment.

In another non-limiting example, the VR director may provide a default option in which particular scene cuts are configured by the director to be performed based on any combination of user interaction or hovers, timer expiration, scene details, starting point orientation preferences, entrance or exit criteria, task completion, object selections, and/or menu selections. In some implementations, the cut scene module 112 can be configured to allow virtual users to make choices (that trigger scene cuts) in the VR environment and the playback environment can interpret those choices (based on VR director input) to perform scene cuts accordingly.

Example triggers that can be associated with VR content being cut may include detection by the VR environment when a user looks away, accelerates toward or away from an object, or decelerates toward or away from an object. Additional example triggers may include gazing near or at a virtual object, gazing at or near a virtual object for a predetermined amount of time (e.g., gaze hold time), and/or hovering near objects for predefined time periods, etc. In some implementations, the trigger may be detection of an expired time window. For example, if the user is in a scene and standing still for thirty seconds, the cut scene module 112 may be configured to cut to a new scene. The new scene may include additional VR content in which to interact with such as menus, instructions, new worlds, controls, etc. In some implementations, the new scene may include a reorientation of the current scene that may be a new starting point for the user to begin interacting with the VR environment. In some implementations, both a position and an orientation of a user within a new scene can independently depend on which trigger was invoked in a previous scene.

In some implementations, the cut scene module 112 can provide, to a VR director (or other editor) default options and/or mapping suggestions. For example, for some desired effects, the cut scene module 112 can suggest mapping dark areas of a first scene to dark areas of a new scene instead of concentrating on mapping objects at similar distances to each other.

In some implementations, a VR director (of a VR movie, for example) can use the cut scene module 112 to select which direction a VR user is facing in a scene based at least in part on the direction the VR user was facing in a previous scene. That is the editing tools 110 can facilitate creation of mapping of a final gaze direction from a previous scene to an initial gaze direction in a new or upcoming scene. In general, the VR director can configure a time window within a scene whereupon the scene will cut to another (configured) scene as soon as the VR user gazes in a desired direction. Similarly, a scene cut can be configured to be performed at the end of the configured time window if, for example, the VR user does not gaze in an intended direction. In that manner the likelihood is increased that the user gazes or looks into a specific direction when the scene cut occurs, thus avoiding disturbance, disorientation, physical imbalance of the user and the like.

In some implementations, the editing tools 110 and system 100 described herein can be configured to automatically analyze video content to suggest or invoke cut-from and cut-to scenes. That is, the system 100 can be used to analyze video to suggest scenarios for performing scene cuts. The analysis may include determining actual or relative distances between a viewer (e.g., a VR user accessing VR content) and various objects in a scene. The distances can be used to suggest default gaze-direction pairs or pattern rules that state, for example, in the event that the user is gazing in one specific direction, perform a first scene cut and in the event that the user is gazing in another specified direction, perform a second scene cut. Using the previous waterfall/skyscraper example above, the system 100 can be configured to automatically pair looking over the waterfall at a river below to looking over the side of the skyscraper at the street below. Similarly, the system 100 can be configured to automatically pair looking in to the river behind the user with looking into the swimming pool. Each of these pairings may be based at least in part on determined relative distances within the video footage and/or VR content.

Although such pairings can be automatically determined and provided as suggestions, a VR director can use the suggestions as a guideline with which to begin editing. In some implementations, the system 100 can provide suggested scene cuts based on general gaze direction from a first scene to another gaze direction in a new scene. In some implementations, the system 100 can analyze two or more scenes to be cut between by performing an initial pass to determine a number of different scene cut possibilities can be accounted for based on gaze zones. For example, the system 100 can determine that if the user in a first scene is in the center of a flat and endless desert scene, four general regions of gaze may be considered (instead of several angles of gaze that may be used if the scene were to be filled with objects, people, or other content). In this example, a first gaze zone may include looking directly at the ground; a second gaze zone may include looking directly at the ground 10-20 feet away; a third gaze zone may include looking at the horizon; and a fourth gaze zone may include looking at the sky. In an alternative scene, such as a busy street in a city, many more gaze zones may be uniquely analyzed and considered when suggesting scene cuts.

Referring to FIG. 1, the scene modification module 114 can be used to configure scenes to account for user reorientation. In particular, module 114 can select a starting position for a user in a subsequent scene based on where the user was gazing in a previous scene. For example, the user may be in a first scene and looking at a wall about ten feet to her left and in the next scene, the virtual content is configured with a waterfall fifty feet in front of the user, a boulder fifteen feet right of the user, and an elephant five feet behind the user. The VR director can use module 114 to configure content to ensure that the user is not startled or discomforted by new content being provided in the VR environment (e.g., via HMD device 106). That is, the module 114 can be used by the VR director to configure orientation guidelines for particular scene cuts are performed. In the above example, the module 114 can configure a scene cut so that the user is oriented at the boulder fifteen feet away rather than looking over the waterfall or at the elephant. In another example, if the user above were instead gazing down a street forty feet away, the scene modification module 114 can be used to configure a scene cut in a way that the user would be comfortable being oriented toward the waterfall after the scene cut is performed. This may be because the amount of distance between the street and the waterfall is similar. A distance that is similar and remote from the user may not cause alarm, distress, or confusion, if a content change is carried out 40-50 feet away from the user.

In some implementations, the user may be provided a scene. The scene and the user may be associated with several different points of view. In general, the VR director can configure some or all of the points of view to be used in response to detected user action or detected VR content changes. In this fashion, the VR director may control (e.g., using scene cuts) what is presented to the user based on what the user viewed or interacted with in previous scenes. In addition, the VR director can use actions performed by the user to determine how scene cuts are implemented and performed. For example, the VR director can configure one or more scene cuts to occur when the user is looking away from a particular zone in the VR environment. For example, the VR director can configure the system 100 to determine whether the user is viewing a rendered mobile device or other controller utilized in the VR environment. If the user is gazing or actively using the mobile device, the director can configure scene cuts to be performed without restriction because the user is likely not looking in a direction toward the new content and therefore may likely not be disturbed by a scenery change. Alternatively, if the user is not actively using the mobile device, the system 100 may be configured to ring the rendered mobile device to make the user interact with the mobile device, for purposes of causing a distraction for the user so that system 100 can perform a scene cut.

In some implementations, particular distractions or events can be configured by a VR director. These distractions or events can be based on VR content, detected user responses, metadata, and/or preconfigured rules, parameters or conditions, any of which can be configured and stored with VR content, and delivered to a user accessing the VR environment. Continuing with the waterfall/skyscraper example above, the VR director may wish to implement a ten second scene cut and would prefer that the user be looking over the waterfall when the cut occurs, so that the VR director can transition the user to look over the skyscraper. In this example, the director can use a distraction, such as a flock of birds flying from a first zone over the zone that includes the waterfall. Such a distraction may be configured to draw the eye of the user in the direction over the waterfall so that the scene cut can provide a comfortable transition for the user. In some implementations, auditory cues can additionally be configured including, but not limited to bird sounds from the general direction of the waterfall. Similarly, if the scene cut is configured to move from the skyscraper view to the waterfall view, the auditory cue may be car horns or sirens over the edge of the waterfall. Content associated with scene cuts and/or distractions can be stored along with video content and/or virtual content. The associated content can be configured for rendering using the editing tools.

In some implementations, the system 100 (e.g., using VR editing tools 110) can be configured to provide the VR director with options in which to configure a cut. For example, the VR editing tools 110 can generate suggestions for providing cuts throughout image content being edited by the director. In particular, the system 100 can provide a list of scene cut options configured for user viewing comfort. The scene cut options may be provided in response to the VR director manually asking for ideal scenarios for a scene cut, for example. The tools system 100 can analyze images of scenes and provide suggestions for when and how to configure scene cuts. The VR director can take those suggestions and use them as suggested or alternatively, the VR director can further modify the suggested scene cuts. In some implementations, the system 100 can be configured to automatically suggest scene cuts based on images being edited.

In some implementations, the VR editing tools 110 can suggest prepackaged scene cut options based on known human senses and VR interactions. For example, the system 100 can use interpupillary distance, parallax requirements, distances from users to objects, lighting, etc. In some implementations, the system 100 can determine and provide audio editing suggestions alongside the scene cut suggestions. For example, if the scene is being cut from a loud nightclub scene in the VR environment to a library scene, the suggested audio cut may be to fade the nightclub noise into quiet, rather than cut off the noise upon performing the scene cut. In this fashion, the user may appear to be exiting a door from the nightclub to the library and the sound would naturally fade, as the user walks away from the door.

In some implementations, the system 100 (e.g., module 114) can analyze particular distances between objects and users depicted in the VR environment to suggest a scene cut to a VR director. The VR director can use the suggestion to configure rules for the scene cut. For example, if the user is within one foot of an object, redirect the attention of the user, and perform the scene cut upon detecting that the gaze or location of the user has been redirected away from a zone in which a scene cut is to be performed. In this way, the VR director may use effects, reorientation, redirection, time, and distance to configure scene cuts in an attempt to illicit a certain experience and/or emotion from the user.

Referring again to FIG. 1, the scenes repository 116 represents a collection of scenes, clips, and cut criteria associated with each scene and/or clip. VR directors may upload, configure, and search for VR content and cut criteria associated with the content. In some implementations, VR directors can generate the scene repository before beginning to stitch together VR content to generate virtual movies. The scenes can be stored in formats such as DV, HDV, P2 MXF (DVCProHD), XDCAM (via plug-in), 2K, 4K and 5K film formats. In some implementations, the scenes can be stored in Virtual Reality Modeling Language (VRML) format, 3D Markup Language for Web (3DMLW), O3D, U3D, Unity3D, and/or X3D formats, rather than in video or film format.

In general, the scenes repository 116 can include real video data and computer-generated video data, each of which can be attached to data and/or metadata providing instructions for a viewing device to interpret both triggers for scene cuts and mapping of final gaze direction to initial gaze directions from scene to scene. In addition, the data and/or metadata can provide the viewing device a mechanism in which to implement the mappings and scene cuts.

In some implementations, the VR content system 108 can include a gaze tracking module (not shown) and a movement tracking module (not shown). The gaze tracking module can interface with one or more sensors, computing systems, cameras, and/or controls to detect gaze/eye movement associated with the user. The one or more sensors, computing systems, cameras, and/or controls may be included (e.g., housed) in HMD device 106, for example. The gaze tracking module can be configured to track or monitor the direction of a user's eye gaze (i.e., tracking or monitoring where/which direction the user is looking). In general, gaze tracking performed by gaze tracking module may include tracking both the orientation and location of one eye or both eyes with respect to a defined coordinate system.

The gaze tracking module can receive images (e.g., video images) of a user's eye. For example, the gaze tracking module can receive or obtain images demonstrating the user's eye movements and gaze direction from an onboard camera in HMD device 106. The gaze tracking module can analyze the images to generate gaze direction information, which can be used to determine the user's gazing direction for use in modifying the VR environment. The gaze direction information can be correlated to a scene of images being displayed in HMD device 106, for example. In particular, the gaze tracking module can use the images to determine at what the user was directly looking at when viewing the scene.

The gaze tracking module can use the gaze direction information for identifying a sequence of gaze attention and/or dwell positions and times. The gaze tracking module can determine whether to trigger execution of some predefined scene cut based on the gaze attention and/or dwell positions and times. In addition, the gaze tracking module can utilize information from sensors or cameras located in HMD device 106, and can map gaze attention of a user, including duration of attention on a target, and sequence of gaze attention over time with respect to elements shown in a virtual environment. The pattern of attention and gaze may be used as a signal to trigger a particular cut or action.

In some implementations, the system 100 can delay action and/or trigger countdown timers before performing particular cuts. In some implementations, the system 100 can take into account acceleration speed or deceleration speed associated with the user when determining whether to perform a cut or when determining whether to display content. For example, in the event that the user quickly speeds through a particular area that includes a trigger for executing VR functionality, the system 100 can determine that the increased speed (i.e., acceleration) into the area indicates that the user does not intend to trigger a scene cut or other action. Accordingly, the system 100 can automatically determine not to render content (or trigger cuts) in that particular area based on the rapid speed of acceleration. In some implementations, such speed can indicate that the user wishes to move through a first area and into another area before triggering interactions between the VR environment and the user.

In operation, the HMD device 106 in system 100 can be connected to device 102 or device 104 to access VR content on VR content system 108, for example. Device 102 or 104 can be connected (wired or wirelessly) to HMD device 106, which can provide VR content for display. In the event that the HMD device is wirelessly connected to device 102 or device 104, the connection may include use of one or more of the high-speed wireless communication protocols described herein. In the event that the HMD device 106 is wired to device 102 or 104, the wired connection can include a cable with an appropriate connector on either end for plugging into device 102 or device 104. For example, the cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the wired connection can include a cable with an appropriate connector on either end for plugging into the HMD device 106 and device 102 or device 104. For example, the cable can include a Universal Serial Bus (USB) connector on both ends. The USB connectors can be the same USB type connector or the USB connectors can each be a different type of USB connector.

In some implementations, one or more content servers (e.g., VR content system 108) and one or more computer-readable storage devices can communicate with the computing devices 102, 104, 106 using network 101 to provide VR content to the devices 102-106. In some implementations, the network 101 can be a public communications network (e.g., the Internet, cellular data network, dialup modems over a telephone network) or a private communications network (e.g., private LAN, leased lines). In some implementations, the computing devices 102-108 can communicate with the network 101 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

In some implementations, the mobile device 102 can execute one or more applications on the VR content system 108 and provide content for the VR environment. In some implementations, the laptop computing device 104 can execute a VR application 110 to provide content from one or more content servers (e.g., VR content server 108). The one or more content servers and one or more computer-readable storage devices can communicate with the mobile device 102 and/or laptop computing device 104 using the network 101 to provide content for display in HMD device 106. In some implementations, the laptop computing device 104 can execute an application hosting the VR editing tools 110 to allow a VR director to modify and/or create VR content.

Figure 2:
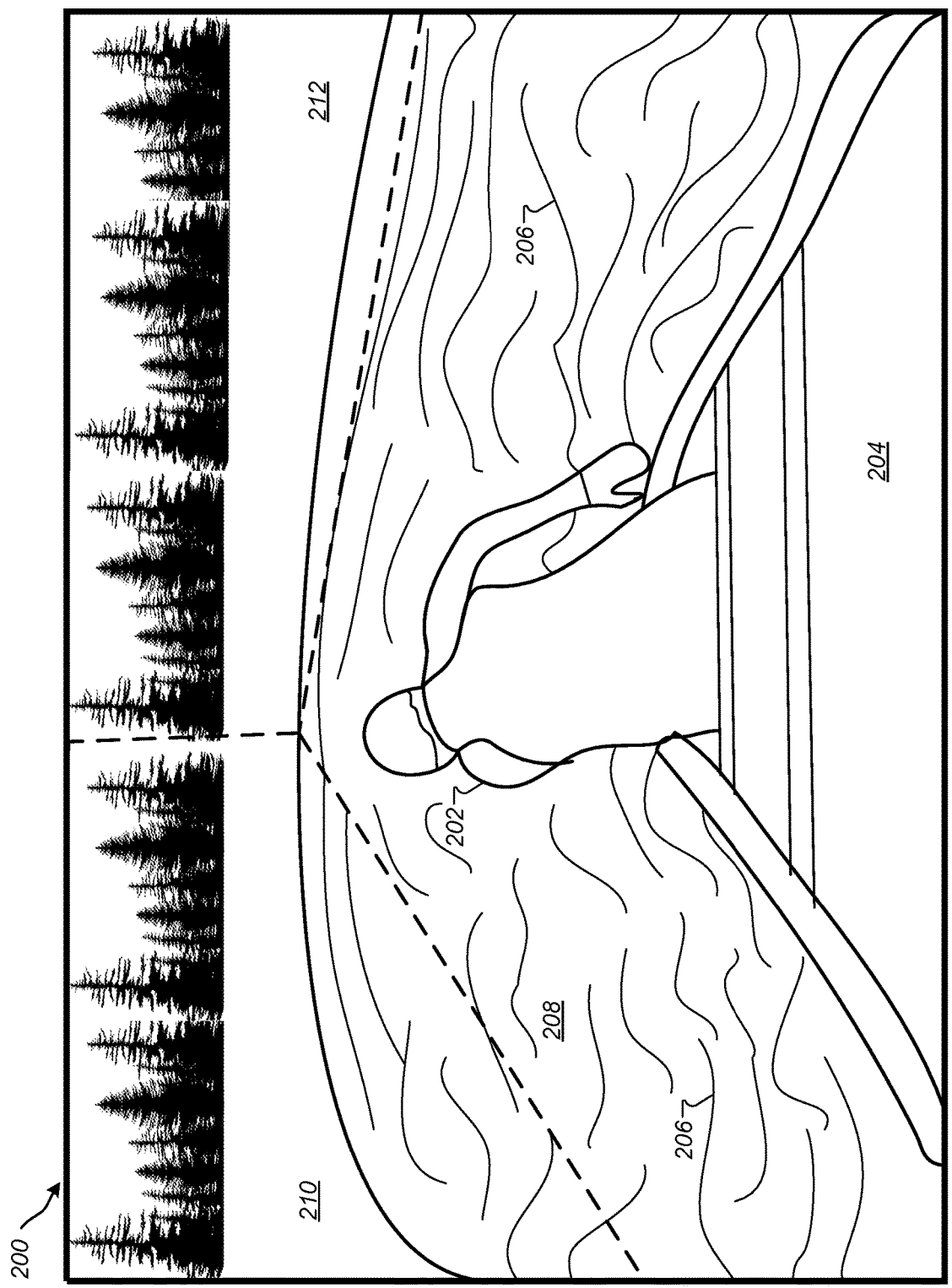
FIG. 2 is an image depicting a view of an example scene depicted in a VR environment.

FIG. 2 is an image depicting a view of an example scene depicted in a VR environment. In the example shown in FIG. 2, a user (not shown) may be watching a rendered version of the user (202) on a display device included in the computing device 102. To do so, a user can put on the HMD device 106 by placing the device 106 over the user's eyes. In general, the example implementation shown in FIG. 2 will be described with respect to one or more users wearing an HMD device that blocks out (e.g., substantially blocks out) the ambient environment, so that the HMD device generates a virtual environment/VR space, with the user's field of view confined to the VR space generated by the HMD device. However, the concepts and features described herein may also be applied to other types of HMD devices, and other types of virtual reality environments and augmented reality environments. In addition, some examples shown in the figures described herein may include a user illustrated as a third-person view of the user wearing an HMD device and holding controllers, computing devices, etc.

In some implementations, referring to FIG. 1, the HMD device 106 can interface with/connect to a display on mobile device 102, for example, using one or more high-speed wired and/or wireless communications protocols (e.g., WiFi, Bluetooth, Bluetooth LE, USB, etc.) or by using an HDMI interface. The connection can provide the content to the HMD device 106 for display to the user on a screen included in the device 106.

A user (not shown) can access VR content in a 3D environment (such as scene 200) using mobile device 102 connected to HMD device 106. While in the VR environment, the user can move around and look around. The system 100 can track user eye gaze (using gaze tracking module 112) and can track user movement (using movement tracking module 114). User movement may indicate how the user is moving their body (or device representing a body part) within the VR environment. User eye gaze may indicate what the user is looking at in the VR environment.

In this example, the scene 200 (displayed in HMD device 106) illustrates rendered user 202 sitting in a watercraft 204 and floating through a large wake/swell 206. The watercraft 204 is near the edge of a waterfall and the user 202 is leaning over and gazing downward toward the river below in a viewing zone 208. The zone 208 may represent a field of view associated with the user while the user is in a current location, head position, and/or gaze direction. In some implementations, the zone 208 may be predefined by the VR director and not associated with the user until the user is rendered as part of the VR environment. In some implementations, the zone represents a portion of user field of view. For example, user field of view may be divided into two, three, four, or more zones. Any detection in one of the zones can be configured to trigger particular scenes to be displayed using scene cuts, for example.

A VR director can configure a scene such as scene 200 with a number of scene cuts based on the user's position, actions, gaze, and/or based on environment constraints. In this example, the VR director may configure scene cuts for scene 200. The scene cuts may be associated with the waterfall view zone 208, a beach zone 210, or another zone 212. One example scene cut can be configured based on the gaze associated with the user 202. Here, the user is looking downward viewing content within zone 208. Because of the downward gaze, the system 100 can make scene cuts and modifications to zones 210 and/or 212 without interrupting the user or distracting the user from the user's current actions. Accordingly, based on the user's eye gaze/head tilt direction, the system 100 can trigger scene cuts using the VR director's predefined scene cut configurations.

Figure 3:
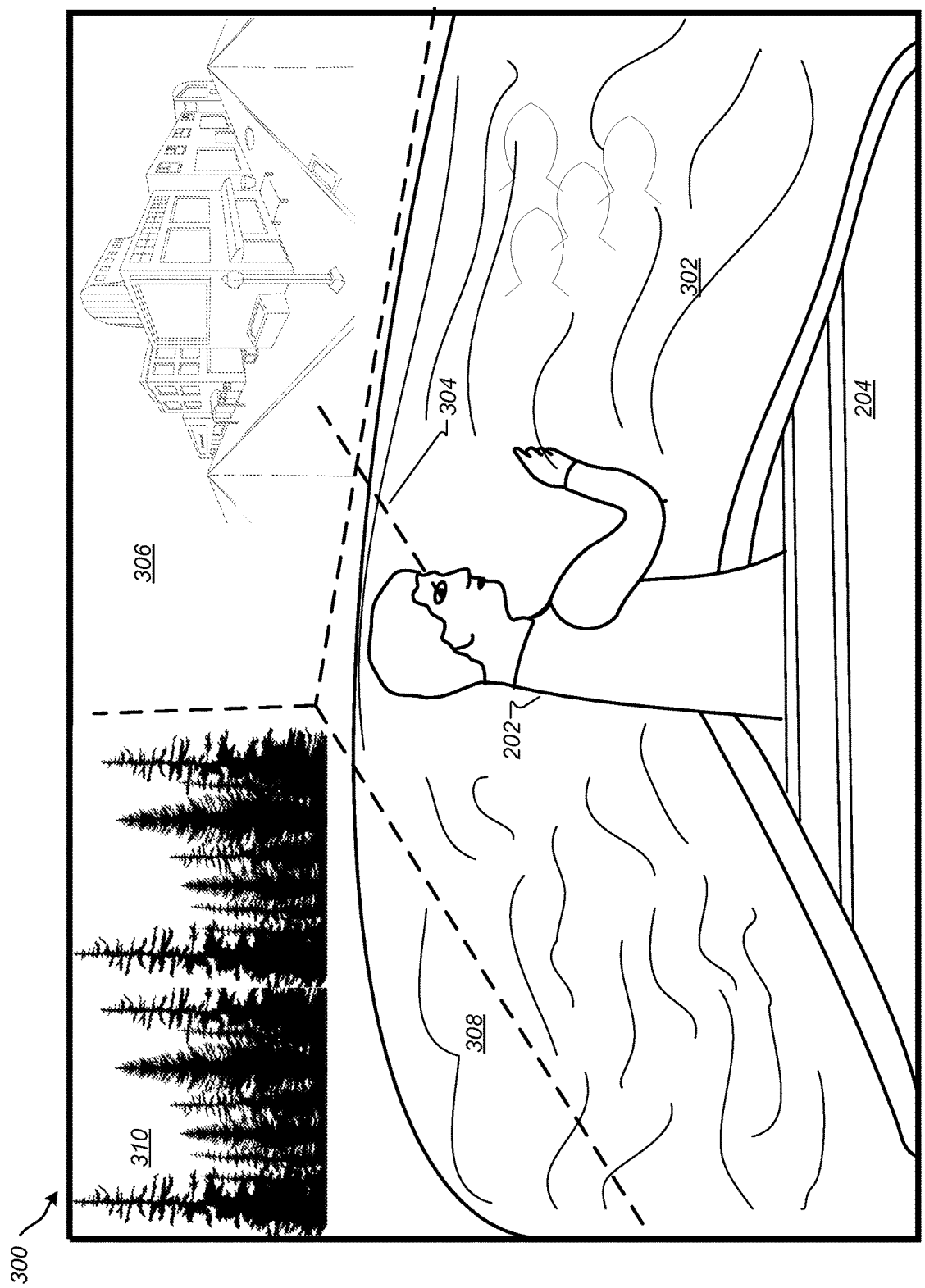
FIG. 3 is an image depicting another view of the scene shown in FIG. 2.

FIG. 3 is an image depicting another view 300 of the scene shown in FIG. 2. In general, the example implementation shown in FIG. 3 will be described with respect to one or more users wearing an HMD device that blocks out (e.g., substantially blocks out) the ambient environment, so that the HMD device generates a virtual environment/VR space, with the user's field of view confined to the VR space generated by the HMD device. However, the concepts and features described herein may also be applied to other types of HMD devices, and other types of virtual reality environments and augmented reality environments. In addition, some examples shown in the figures described herein may include a user illustrated as a third-person view of the user wearing an HMD device and holding controllers, computing devices, etc.

In this example, the user has moved over the waterfall shown in FIG. 2. The user is shown floating in the watercraft 204 in a zone 302 below the waterfall. The gaze 304 of the user has changed from peering downward to peering out at the shoreline, shown by zone 306. Zone 306 may correspond to zone 212 (FIG. 2), however in this scene 300, a scene cut has been performed to provide additional accessible imagery. In particular, the zone 306 now shows an illustration of a small town with accessible shops and sidewalks in which to explore. Zone 308 is also updated with a new scene that depicts the tree line from FIG. 2 from a closer distance. The scene change in zone 308 may have been due to the user moving closer to the tree line 310, and system 100 can provide the zoomed in version of the tree line 310 upon detecting the user movement. In some implementations, the system 100 may have been configured to perform a scene cut to provide the zoomed tree line 310 in zone 308, as well as the small town content shown in zone 306. The scene cut may have been configured to take into account the user's gaze 304 upon moving through and over the waterfall. If the user were to have looked left toward zone 310, instead of right toward zone 306, the system 100 may have swapped the content shown in the zones, to direct the user toward the small town, which could be alternatively placed in the direction of the user's gaze, in the event that the user gazed toward the left side of view 300.

In some implementations, the system 100 can determine how content is stitched together within a zone or between zones. For example, a VR director can provide user-based triggers that stitch content together according to user location or movement within a scene. For example, if the user is paddling the watercraft 204, the system 100 can detect the side of the paddling and make scene cuts, for example, to extend the river scenes thirty feet ahead of the watercraft. In addition, the system 100 can detect the user's head position and can provide a scene cut to attract the user's attention to one side or another. For example, if the user is nearing the end of the river scene footage, the system 100 can perform a scene cut to provide a dock twenty feet ahead of the user on the side of the river that the user is ignoring. The dock can signal to the user to exit the water.

In some implementations, the system 100 can provide a scene cut based on interactions previously performed by the user. For example, if the user has accessed the river in a prior VR session, the system 100 can be configured to provide additional scene cuts with additional scenes, content, and/or options for the user to enjoy. In another example, if the user visited the town shown in zone 306, the system 100 can be configured (by a VR director) to provide a different town or an altered town to indicate that the town has changed. In this fashion, the user can experience new content based on a previous visit (e.g., session) in the VR environment.

In some implementations, the system 100 can be configured to analyze user behavior before performing a scene cut. For example, if the user is looking backward from the waterfall in FIG. 2 and paddling to move away from the waterfall, the system (e.g., HMD device 106) can detect the movements, increased heart rate, and gaze direction and determine that the user is fearful of going over the waterfall. To coax the user over the waterfall, the system 100 may perform a scene cut to the waterfall drop height when the user is looking away. The scene cut can be configured to shorten the drop height to lessen the fear of the user. Similarly, performing the waterfall drop scene cut to shorten the drop height can be an additional trigger to make future scene cuts. For example, if the system 100 determines the fear of the user with respect to the waterfalls, the system 100 may be configured to provide cut scenes that provide less adventurous obstacles throughout the course of the river scene in the VR environment. The system 100 can also build the user up to difficult obstacles by changing which scene cuts are provided according to the user behavior and response.

In some implementations, the video footage provided to the VR director tasked with configuring scene cuts, may be prerecorded footage in which a viewer is simply along for the view of such footage and scene cuts. The user may have limited interaction, such as being able to gaze in different directions, or move in different direction within a scene. In some implementations, the viewer may not interact with the fundamental scene changes occurring in the VR content and may simply view the content from a vantage point without affecting VR content in the scenes. In some implementations, the viewer may be able to interact with scenery and VR objects generated using the video footage as a basis.

Figure 4:
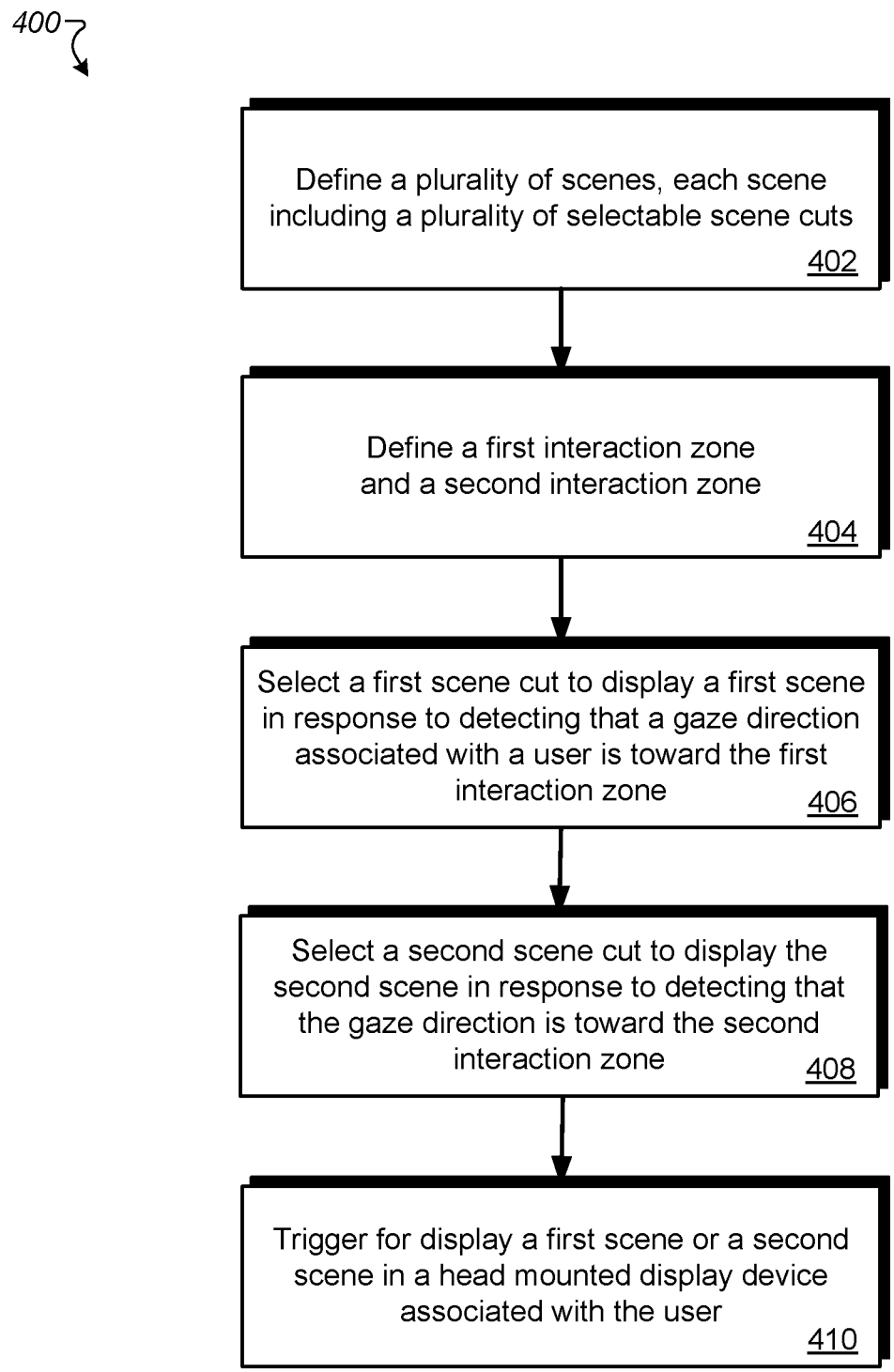
FIG. 4 is a flow chart diagramming one embodiment of a process to configure interaction zones for a VR environment.

FIG. 4 is a flow chart diagramming one embodiment of a process 400 to configure interaction zones for a virtual reality environment. In various embodiments, the process 400 may be used or produced by the systems such as those of FIG. 1.

As shown in FIG. 4, at block 402, the system 100 can define a plurality of images, the images. The images may include a plurality of scenes. Each scene may include a plurality of selectable scene cuts. For example, each scene can include any number of images that can be selected by a director to cut from a last scene to a new scene encompassed by one of the images. Once the scene cut occurs, a video of the plurality of scenes can continue to advance through images until another scene cut is determined to be triggered.

In general, the plurality of images may pertain to captured video footage, still scenes, animations, image frames, etc. The plurality of scenes can be preconfigured or configured by the VR director. Selectable scene cuts may be provided as system-configured selectable image frames within the plurality of images. In some implementations, the scene cuts may represent image frames that a VR director can select within VR content. In some implementations, the plurality of selectable scene cuts are provided in a VR editing module (e.g., software tool). Users/directors can select portions of the tool to generate and edit images, scenes, video, and virtual content. The tool may be configured to define a plurality of interaction zones within the plurality of scenes, defining a plurality of scenes using a plurality of images and to associate at least one of the selectable scene cuts with at least one of the scenes and at least one of the interaction zones.

At block 404, the system 100 can define a first interaction zone and a second interaction zone. The first interaction zone may include (or be associated with) a first scene. The second interaction zone may include (or be associated with) a second scene. For example, FIG. 3 includes a first interaction zone 306 and a second interaction zone 302. The first interaction zone 306 depicts a small town that the user 202 can exit the water to explore and the second interaction zone 302 includes a pond. Before the user 202 dropped over the waterfall (from FIG. 2), zones 306 and 302 included either tree line or rapid swells. Now that the user is actively gazing at zone 306, the system 100 may be configured to perform a scene cut to depict a new scene in which to allow the user to interact.

At block 406, the system 100 can automatically select a first scene cut to display the first scene, in response to detecting that a gaze direction, associated with a user accessing the virtual reality environment, is directed toward the first interaction zone. For example, the system 100 can detect that the user 202 is looking in the direction of zone 306 and may have selected a scene cut to provide the imagery (e.g., virtual content) depicting a scene of a small town in the distance to attract the gaze of the user 202. In another example, the system 100 may have provided content in zone 306 because the user was actively looking in the direction of zone 306.

In some implementations, the system 100 can display one or more virtual features in addition to performing scene cuts for the VR environment. For example, in the event that the user 202 does not change a gaze (e.g., eye gaze direction) for a long time period, the system 100 can detect that a countdown timer of two minutes has been exhausted and in response can display a virtual feature (e.g., flashing light or dimming of the scene) before eventually performing the first or the second scene cut for display in the HMD device 106. In general, the virtual feature may be configured to attract the gaze direction of the user 202 so that the user looks toward the second interaction zone, for example.

At block 408, the system 100 can automatically select a second scene cut to display the second scene, in response to detecting that the gaze direction, associated with the user accessing the virtual reality environment, is directed toward the second interaction zone. For example, the system 100 can select a scene cut to provide fishing equipment in zone 306 (or zone 302) if, for example, the gaze of the user is detected looking toward the direction of content in zone 302 (e.g., fish in this example).

At block 410, the system 100 can provide (e.g., trigger) the first scene or second scene for display in a head mounted display device associated with the user. For example, the system 100 can provide the first town scene or the second fishing equipment scene in the HMD device 106. The first scene may be displayed according to the first scene cut. The second scene may be displayed according to the second scene cut.

In some implementations, the system 100 can display the first or second scene in the HMD device 106 based at least in part on a detected location of the user within the VR environment. The location can be used to select either scene and the selected scene or another scene can be provided in the HMD device 106 based on the location of the user in the VR environment.

In some implementations, the system 100 can detect a location of the user within the virtual reality environment and can generate content to extend the first scene, based on the location. For example, the system 100 may generate and trigger for display extended scenes for the first scene, in response to determining that the user is moving toward the first interaction zone. The system 100 can trigger for display, in the head mounted display device, the generated (extended) content using a third scene cut to do so. In some implementations, the third scene cut may be performed upon the system 100 determining that the gaze direction associated with the user is directed away from the first interaction zone. That is, the system 100 can wait for an opportune moment to provided additional extended content so that the content is not perceived by the user as unnaturally placed content.

In some implementations, the process 400 may include receiving user settings. For example, the user settings may be received, detected, or preconfigured. The user settings may indicate a level of experience for the user with the virtual environment. In some implementations, the user settings may indicate an exhibition level that classifies the user as wishing to experience thrill-seeking virtual scenarios. Similarly, the user settings may indicate that a user wishes to remove anxiety inducing features such as heights, water effects, imagery, etc. The user settings can be used to select particular scenes and scene cuts. In particular, the user settings can be used to modify particular selected scenes according to the user settings.

In some implementations, selecting the first or second scene includes reorienting a display for the user based on the detected gaze direction associated with the user. The reorientation may pertain to how a user is placed within the VR environment. In some implementations, the reorientation may pertain to how VR content is placed around the user in the VR environment. In some implementations, the reorientation may pertain to providing extended scene content or additional scene content for a user to enjoy upon changing a gaze direction.

In some implementations, the system 100 can automatically select and perform the first scene cut and trigger the first scene cut for display in HMD device 106, in response to exhausting a countdown timer. For example, the first scene cut can be performed at the end of a ten second window if the user does not trigger the scene cut in another way. In response to exhausting a countdown timer, the system 100 can generate a virtual feature for the second interaction zone and perform the second scene cut upon triggering display of the virtual feature in the head mounted display device. The system 100 can then trigger display of the second scene in the head mounted display device. In some implementations, the virtual feature is configured to attract the gaze direction, associated with the user, toward the second interaction zone in the virtual reality environment. For example, if a director (or content creator) wishes to provide particular content in a scene, the director (or content creator) may wish to distract the user by displaying a virtual feature to attract the user's gaze while the scene change (and cuts) are placed in the virtual environment.

Figure 5:
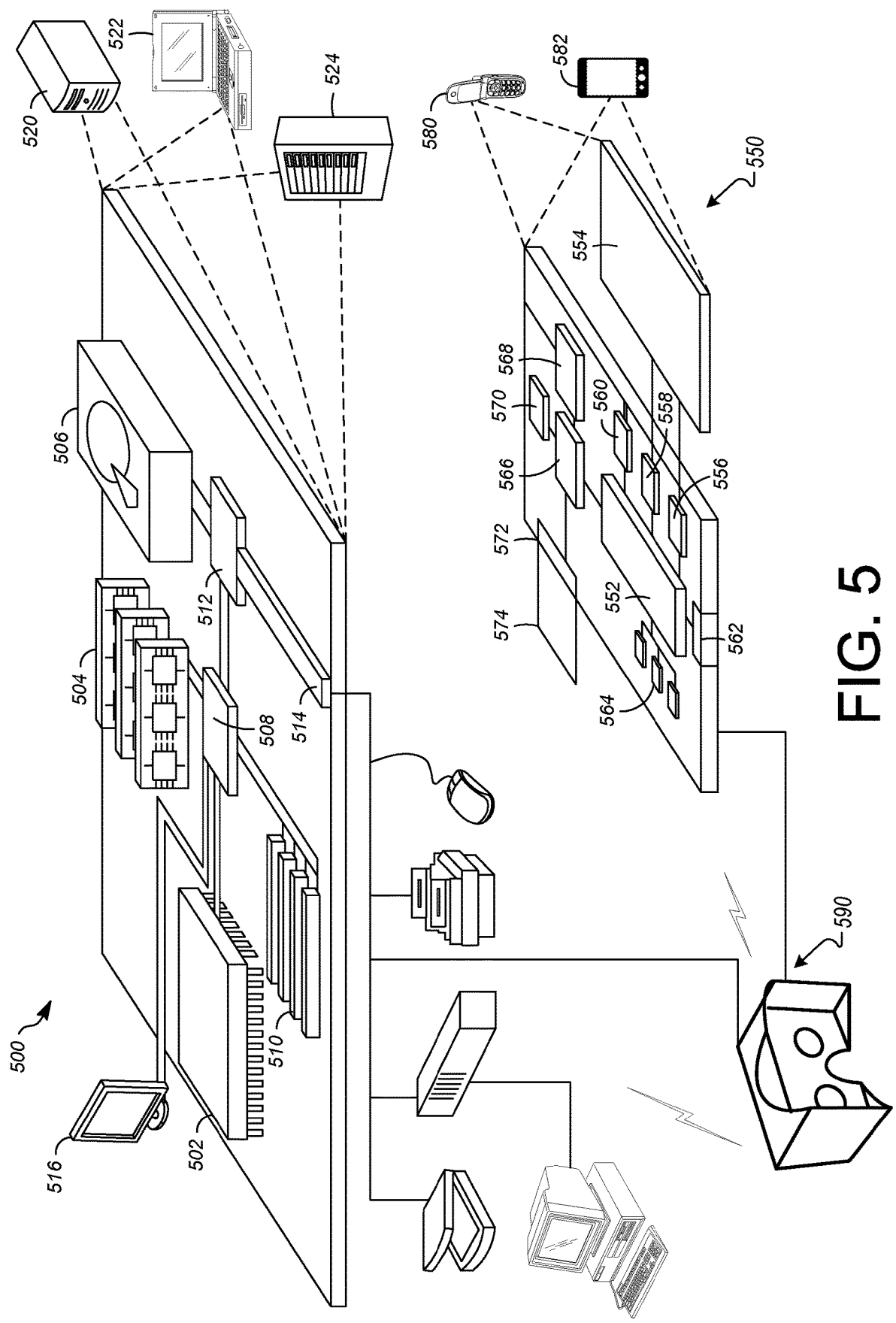
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. In addition, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 5 can include sensors that interface with a virtual reality (HMD device 590). For example, one or more sensors included on a computing device 550 or other computing device depicted in FIG. 5, can provide input to HMD device 590 or in general, provide input to a VR environment. The sensors can include, but are not limited to, a touchscreen, accelerometers, gyroscopes, pressure sensors, biometric sensors, temperature sensors, humidity sensors, and ambient light sensors. The computing device 550 can use the sensors to determine an absolute position and/or a detected rotation of the computing device in the VR environment that can then be used as input to the VR environment. For example, the computing device 550 may be incorporated into the VR environment as a virtual object, such as a controller, a laser pointer, a keyboard, a weapon, etc. Positioning of the computing device/virtual object by the user when incorporated into the VR environment can allow the user to position the computing device to view the virtual object in certain manners in the VR environment. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 550 can be used as input to the VR environment. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 550 when the computing device is incorporated into the VR environment can cause a particular action to occur in the VR environment.

In some implementations, a touchscreen of the computing device 550 can be rendered as a touchpad in VR environment. A user can interact with the touchscreen of the computing device 550. The interactions are rendered, in HMD device 590 for example, as movements on the rendered touchpad in the VR environment. The rendered movements can control objects in the VR environment.

In some implementations, one or more output devices included on the computing device 550 can provide output and/or feedback to a user of the HMD device 590 in the VR environment. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 550 may appear as another object in a computer-generated, 3D environment. Interactions by the user with the computing device 550 (e.g., rotating, shaking, touching a touchscreen, swiping a finger across a touch screen) can be interpreted as interactions with the object in the VR environment. In the example of the laser pointer in a VR environment, the computing device 550 appears as a virtual laser pointer in the computer-generated, 3D environment. As the user manipulates the computing device 550, the user in the VR environment sees movement of the laser pointer. The user receives feedback from interactions with the computing device 550 in the VR environment on the computing device 550 or on the HMD device 590.

In some implementations, a computing device 550 may include a touchscreen. For example, a user can interact with the touchscreen in a particular manner that can mimic what happens on the touchscreen with what happens in the VR environment. For example, a user may use a pinching-type motion to zoom content displayed on the touchscreen. This pinching-type motion on the touchscreen can cause information provided in the VR environment to be zoomed. In another example, the computing device may be rendered as a virtual book in a computer-generated, 3D environment. In the VR environment, the pages of the book can be displayed in the VR environment and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR environment to control objects in the VR environment.

Computing device 500 is intended to represent varying forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method of configuring interaction zones for an augmented reality environment, the method comprising:
   defining a plurality of scenes, each scene from the plurality of scenes including a plurality of selectable scene cuts;
   defining a first interaction zone and a second interaction zone, the first interaction zone being associated with a first scene in the plurality of scenes and the second interaction zone being associated with a second scene in the plurality of scenes;
   automatically selecting a first scene cut from the plurality of selectable scene cuts to display the first scene, in response to detecting that a gaze direction, associated with a user accessing the augmented reality environment, is directed toward the first interaction zone;
   automatically selecting a second scene cut from the plurality of selectable scene cuts to display the second scene, in response to detecting that the gaze direction, associated with the user accessing the augmented reality environment, is directed toward the second interaction zone;
   in response to exhausting a countdown timer:
      generating a virtual feature for the first interaction zone or the second interaction zone,
      triggering display of the generated virtual feature, and
      triggering display of the first scene according to the first scene cut or the second scene according to the second scene cut based at least in part on the detected gaze direction,
   wherein automatically selecting the first scene cut or automatically selecting the second scene cut triggers mapping of a final gaze direction of the user from a previous scene to an initial gaze direction of the user for the first scene or the second scene.

2. The method of claim 1, further comprising:
   detecting a location of the user within the augmented reality environment;
   generating content to extend the first scene, in response to determining that the user is moving toward the first interaction zone; and
   triggering for display in a head mounted display device, the generated content using a third scene cut, when the gaze direction associated with the user is directed away from the first interaction zone.

3. The method of claim 1, further comprising:
   receiving user settings indicating a level of experience for the user with the augmented reality environment; and
   modifying at least one selected scene according to the user settings.

4. The method of claim 1, wherein the plurality of selectable scene cuts are provided in augmented reality editing software for:
   defining a plurality of interaction zones within the plurality of scenes;
   defining a plurality of scenes using a plurality of images; and
   associating at least one of the plurality of selectable scene cuts with at least one of the plurality of scenes and at least one of the plurality of interaction zones.

5. The method of claim 1, wherein the virtual feature is configured to attract the gaze direction, associated with the user, toward the second interaction zone in the virtual reality environment.

6. A non-transitory, machine-readable medium having instructions stored thereon, the instructions, when executed by a processor, cause a computing device to:
   define a plurality of scenes, each scene from the plurality of scenes including a plurality of selectable scene cuts;
   define a first interaction zone and a second interaction zone, the first interaction zone being associated with a first scene in the plurality of scenes and the second interaction zone being associated with a second scene in the plurality of scenes;
   automatically select a first scene cut from the plurality of selectable scene cuts to display the first scene, in response to detecting that a gaze direction, associated with a user accessing an augmented reality environment, is directed toward the first interaction zone;
   automatically select a second scene cut from the plurality of selectable scene cuts to display the second scene, in response to detecting that the gaze direction, associated with the user accessing the augmented reality environment, is directed toward the second interaction zone; and
   in response to exhausting a countdown timer:
      generating a virtual feature for the first interaction zone or the second interaction zone,
      triggering display of the generated virtual feature, and
      triggering display of the first scene according to the first scene cut or the second scene according to the second scene cut based at least in part on the detected gaze direction,
   wherein automatically selecting the first scene cut or automatically selecting the second scene cut triggers mapping of a final gaze direction of the user from a previous scene to an initial gaze direction of the user for the first scene or the second scene.

7. The non-transitory, machine-readable medium of claim 6, wherein the instructions further cause the computing device to:
   detect a location of the user within the augmented reality environment;
   generate content to extend the first scene, in response to determining that the user is moving toward the first interaction zone; and
   trigger, for display in a head mounted display device, the generated content using a third scene cut, when the gaze direction associated with the user is directed away from the first interaction zone.

8. The non-transitory, machine-readable medium of claim 6, wherein the instructions further cause the computing device to:
   receive user settings indicating a level of experience for the user with the augmented reality environment; and
   modify at least one selected scene according to the user settings.

9. The non-transitory, machine-readable medium of claim 6, wherein the instructions further cause the computing device to:
   define a plurality of interaction zones within the plurality of scenes;
   define a plurality of scenes using a plurality of images; and
   associate at least one of the plurality of selectable scene cuts with at least one of the plurality of scenes and at least one of the plurality of interaction zones.

10. The non-transitory, machine-readable medium of claim 6, wherein the virtual feature is configured to attract the gaze direction, associated with the user, toward the second interaction zone in the virtual reality environment.

11. A system comprising:
    memory; and
    at least one processor coupled to the memory, the at least one processor being configured to:
       define a plurality of scenes, each scene from the plurality of scenes including a plurality of selectable scene cuts;
       define a first interaction zone and a second interaction zone, the first interaction zone being associated with a first scene in the plurality of scenes and the second interaction zone being associated with a second scene in the plurality of scenes;
       automatically select a first scene cut from the plurality of selectable scene cuts to display the first scene, in response to detecting that a gaze direction, associated with a user accessing an augmented reality environment, is directed toward the first interaction zone;
       automatically select a second scene cut from the plurality of selectable scene cuts to display the second scene, in response to detecting that the gaze direction, associated with the user accessing the augmented reality environment, is directed toward the second interaction zone; and
       in response to exhausting a countdown timer:
          generating a virtual feature for the first interaction zone or the second interaction zone,
          triggering display of the generated virtual feature, and
          triggering display of the first scene according to the first scene cut or the second scene according to the second scene cut based at least in part on the detected gaze direction,
       wherein automatically selecting the first scene cut or automatically selecting the second scene cut triggers mapping of a final gaze direction of the user from a previous scene to an initial gaze direction of the user for the first scene or the second scene.

12. The system of claim 11, wherein the at least one processor is further configured to:
    detect a location of the user within the augmented reality environment;
    generate content to extend the first scene, in response to determining that the user is moving toward the first interaction zone; and
    trigger for display in a head mounted display device, the generated content using a third scene cut, when the gaze direction associated with the user is directed away from the first interaction zone.

13. The system of claim 11, wherein the at least one processor is further configured to:
    receive user settings indicating a level of experience for the user with the augmented reality environment; and
    modify the selected scene according to the user settings.

14. The system of claim 11, wherein the virtual feature is configured to attract the gaze direction, associated with the user, toward the second interaction zone in the virtual reality environment.

15. The system of claim 11, wherein the at least one processor is further configured to:
    define a plurality of interaction zones within the plurality of scenes;
    define a plurality of scenes using a plurality of images; and
    associate at least one of the plurality of selectable scene cuts with at least one of the plurality of scenes and at least one of the plurality of interaction zones.

16. The method of claim 1, further comprising:
    generating, for display in the augmented reality environment, the plurality of selectable scene cuts; and
    in response to receiving user selection of at least one of the plurality of scene cuts, performing the at least one selected scene cut to display an additional scene in the augmented reality environment without exhausting a countdown timer.

17. The method of claim 1, wherein triggering for display, the first scene according to the first scene cut or the second scene according to the second scene cut includes reorienting a view of the first scene or the second scene based on a position and an orientation of the user accessing the augmented reality environment.

18. The method of claim 1, wherein automatically selecting the first scene cut or automatically selecting the second scene cut triggers mapping of a final gaze direction of the user from a previous scene to an initial gaze direction of the user for the first scene or the second scene.

* * * * *